(12) United States Patent
Teraue

(10) Patent No.: US 8,520,257 B2
(45) Date of Patent: Aug. 27, 2013

(54) COLOR VALUE ACQUIRING METHOD, COLOR VALUE ACQUIRING APPARATUS, IMAGE PROCESSING METHOD, IMAGE PROCESSING APPARATUS, AND RECORDING MEDIUM

(75) Inventor: Eiji Teraue, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 532 days.

(21) Appl. No.: 12/878,491

(22) Filed: Sep. 9, 2010

(65) Prior Publication Data

US 2011/0058198 A1 Mar. 10, 2011

(30) Foreign Application Priority Data

Sep. 10, 2009 (JP) ................................. 2009-209303
Aug. 30, 2010 (JP) ................................. 2010-192766

(51) Int. Cl.
*H04N 1/60* (2006.01)
(52) U.S. Cl.
USPC ............ 358/1.9; 358/1.1; 358/518; 399/342; 399/296; 399/326; 399/341; 382/162; 382/167; 345/593
(58) Field of Classification Search
None
See application file for complete search history.

(56) References Cited

U.S. PATENT DOCUMENTS

| | | | | |
|---|---|---|---|---|
| 4,178,096 A * | 12/1979 | Lontz | ............................... | 355/32 |
| 4,305,768 A * | 12/1981 | Lontz | ............................... | 156/64 |
| 4,979,032 A * | 12/1990 | Alessi et al. | .................. | 358/527 |
| 6,633,408 B1 * | 10/2003 | Rozzi | ............................. | 358/1.9 |
| 6,943,915 B1 * | 9/2005 | Teraue | ........................... | 358/1.9 |
| 6,985,254 B2 * | 1/2006 | Allen et al. | ..................... | 358/1.9 |
| 7,037,398 B2 * | 5/2006 | Kwasny et al. | ................ | 156/230 |
| 7,140,709 B2 * | 11/2006 | Couwenhoven et al. | ....... | 347/15 |
| 7,210,753 B2 * | 5/2007 | Couwenhove | ..................... | 347/6 |
| 7,236,734 B2 * | 6/2007 | Ng et al. | ........................ | 399/341 |
| 7,340,208 B2 * | 3/2008 | Ng | ................................. | 399/329 |
| 7,433,102 B2 * | 10/2008 | Takahashi et al. | ............. | 358/518 |
| 7,502,582 B2 * | 3/2009 | Ng et al. | ........................ | 399/296 |
| 7,720,425 B2 * | 5/2010 | Ng et al. | ........................ | 399/342 |
| 7,764,401 B2 * | 7/2010 | Miyata | ........................... | 358/1.9 |
| 7,924,460 B2 * | 4/2011 | Ng | ................................. | 358/1.9 |
| 8,005,415 B2 * | 8/2011 | Ng et al. | ........................ | 399/342 |
| 8,049,924 B2 * | 11/2011 | Mestha et al. | ................. | 358/1.9 |
| 8,072,646 B2 * | 12/2011 | Mestha et al. | ................. | 358/1.9 |
| 8,390,882 B2 * | 3/2013 | Dalal et al. | ..................... | 358/1.9 |
| 2002/0036787 A1 * | 3/2002 | Kondo | ............................ | 358/1.9 |
| 2002/0180996 A1 * | 12/2002 | Allen et al. | .................... | 358/1.9 |

(Continued)

FOREIGN PATENT DOCUMENTS

JP 2000-217007 A 8/2000

*Primary Examiner* — King Poon
*Assistant Examiner* — Ted Barnes
(74) *Attorney, Agent, or Firm* — Sughrue Mion, PLLC

(57) ABSTRACT

Color reproduction data of a print obtained by forming an image on a print medium corresponding to an input type thereof, and spectral data of a laminate film corresponding to an input type thereof are acquired. A reference color is determined based on color information of a designated color to be reproduced on a protective-film-covered print. Based on the acquired color reproduction data and the acquired spectral data, the determined reference color is converted into another reference color depending on the print without the laminate film thereon. A color value depending on a color patch that is selected as a color closest to the designated color, under a condition where the laminate film is not laminated, from a designated color adjusting color chart printed based on color values depending on the converted other reference color or colors close to the other reference color, is acquired.

13 Claims, 10 Drawing Sheets

(56) References Cited

U.S. PATENT DOCUMENTS

| | | | |
|---|---|---|---|
| 2003/0016862 A1* | 1/2003 | Ohga | 382/162 |
| 2003/0067504 A1* | 4/2003 | Spurr et al. | 347/19 |
| 2004/0001072 A1* | 1/2004 | Newman | 345/593 |
| 2004/0032602 A1* | 2/2004 | Teraue | 358/1.9 |
| 2005/0243341 A1* | 11/2005 | Ng | 358/1.9 |
| 2006/0072170 A1* | 4/2006 | Kawakami et al. | 358/504 |
| 2006/0133870 A1* | 6/2006 | Ng et al. | 399/341 |
| 2007/0058186 A1* | 3/2007 | Tanaka | 358/1.9 |
| 2007/0287082 A1* | 12/2007 | Ng | 430/47.5 |
| 2007/0289705 A1* | 12/2007 | Johnson et al. | 156/277 |
| 2008/0130023 A1* | 6/2008 | Perez et al. | 358/1.9 |
| 2008/0282915 A1* | 11/2008 | Horita | 101/211 |
| 2009/0021807 A1* | 1/2009 | Horita | 358/518 |
| 2009/0092316 A1* | 4/2009 | Matsuzaki | 382/167 |
| 2009/0219554 A1* | 9/2009 | Freyer et al. | 358/1.9 |
| 2010/0053647 A1* | 3/2010 | Baba | 358/1.9 |
| 2011/0032546 A1* | 2/2011 | Dalal et al. | 358/1.9 |
| 2012/0099121 A1* | 4/2012 | No et al. | 358/1.1 |
| 2012/0099122 A1* | 4/2012 | No et al. | 358/1.1 |

* cited by examiner

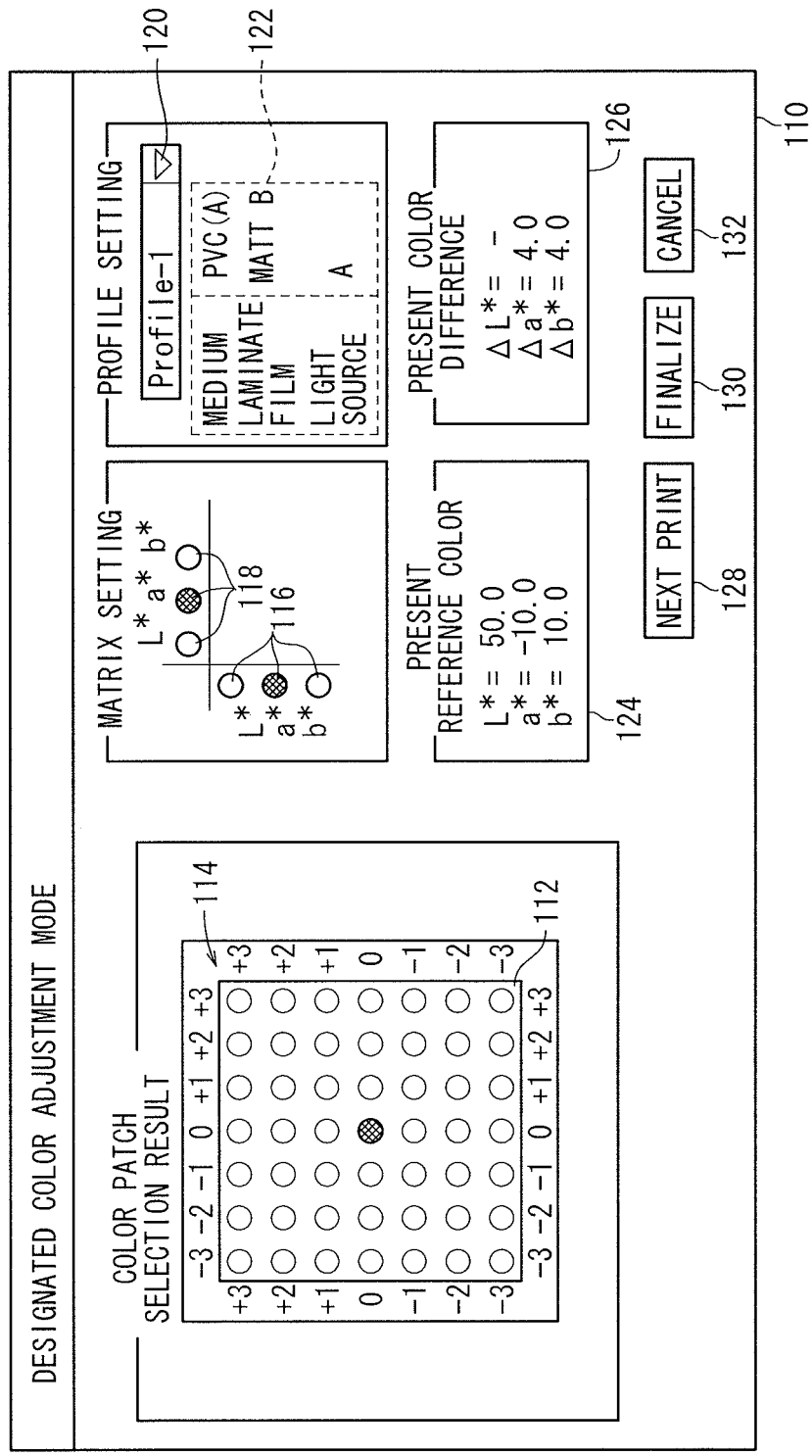

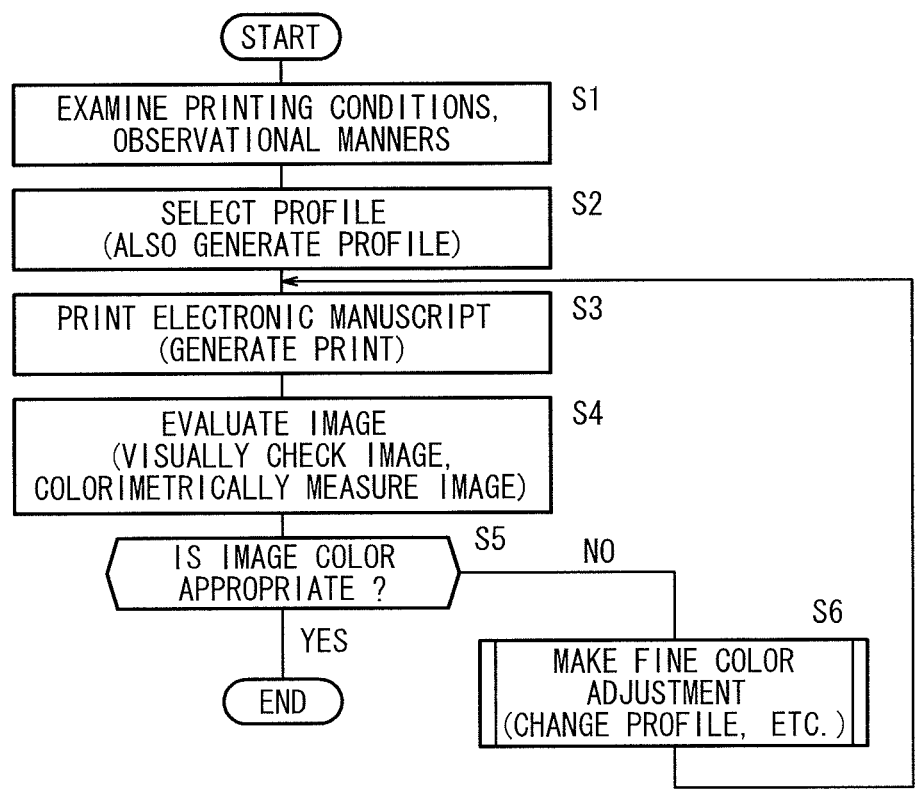

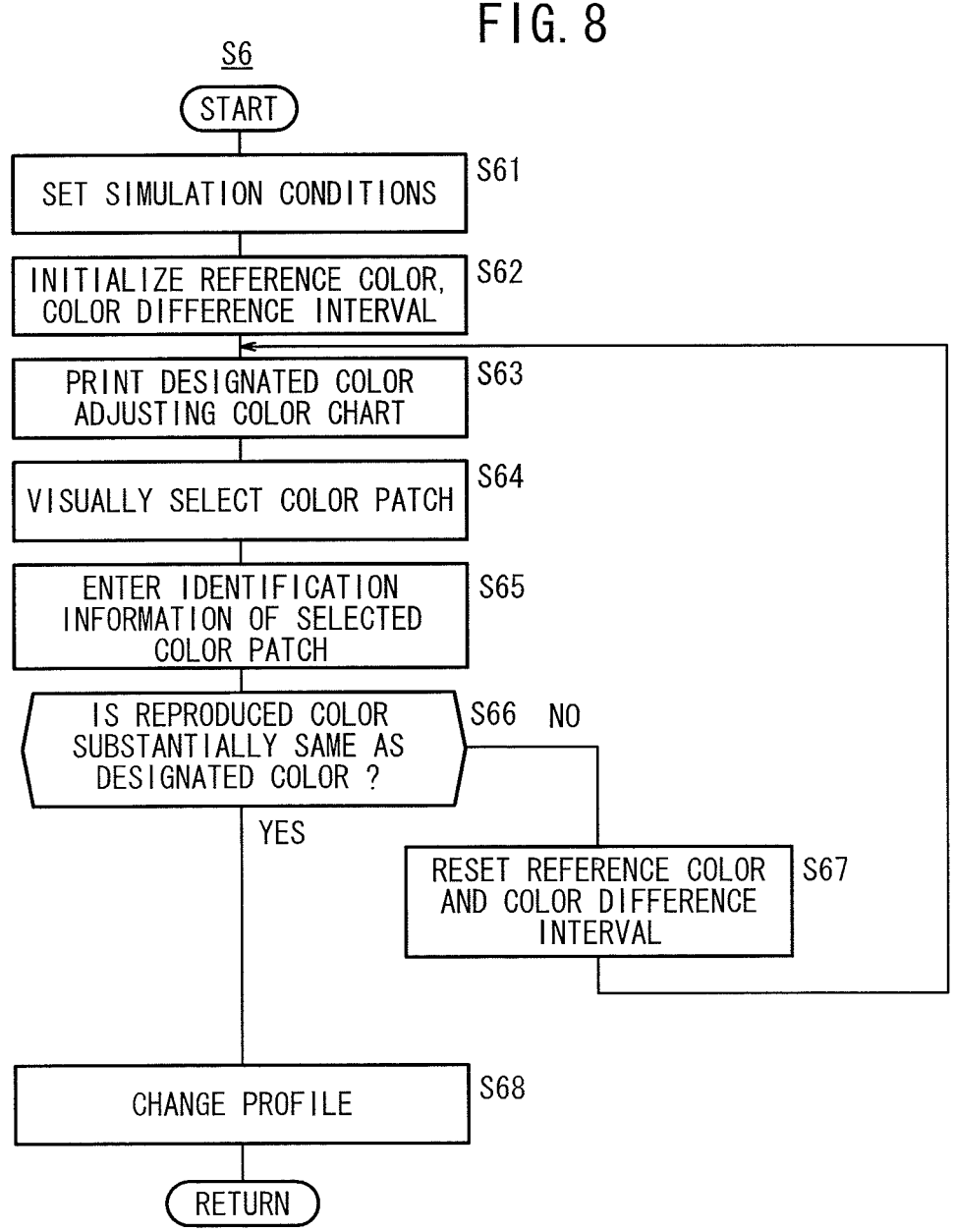

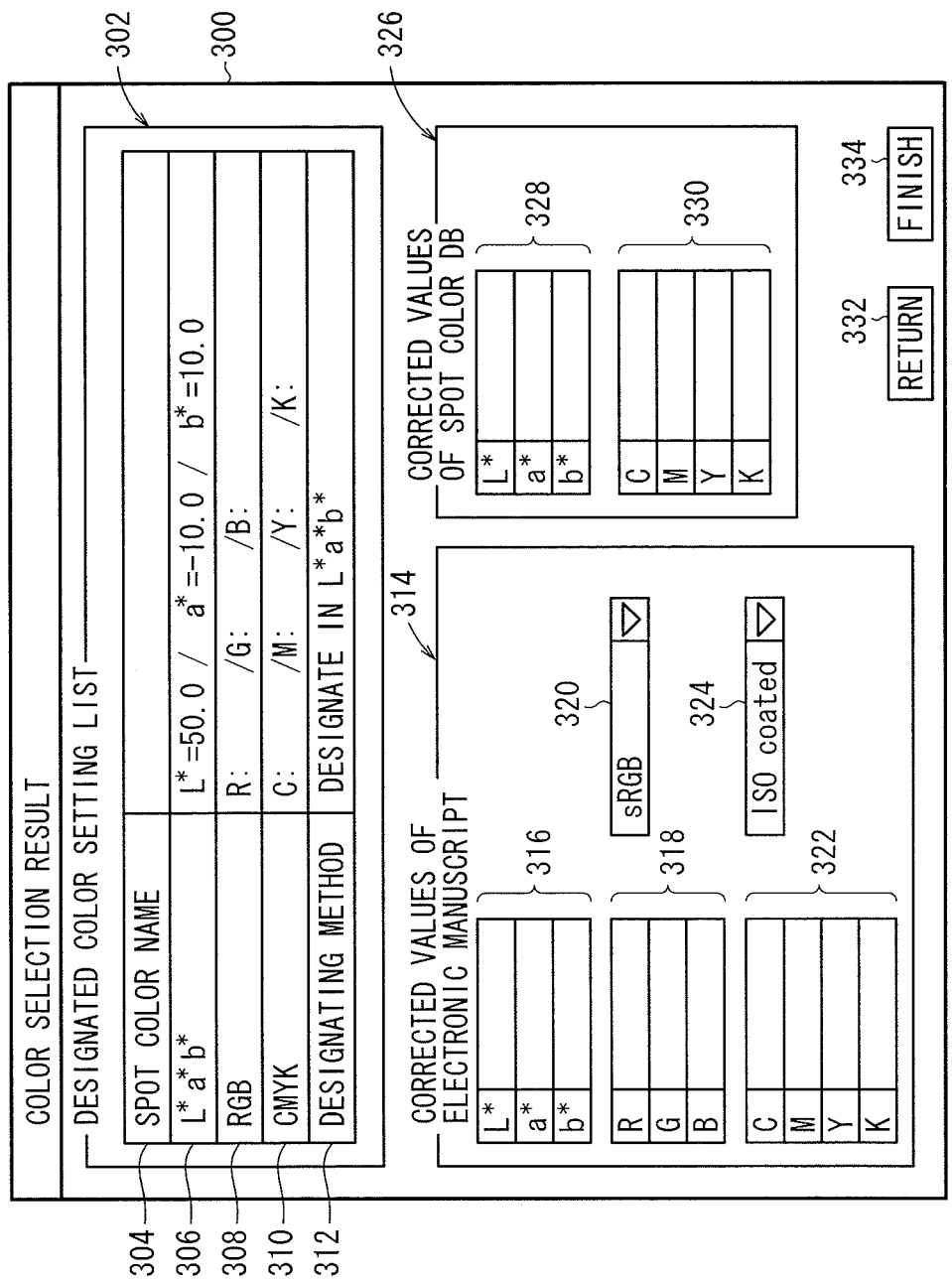

COLOR VALUE ACQUIRING METHOD, COLOR VALUE ACQUIRING APPARATUS, IMAGE PROCESSING METHOD, IMAGE PROCESSING APPARATUS, AND RECORDING MEDIUM

CROSS-REFERENCE TO RELATED APPLICATION

This application is based upon and claims the benefit of priority from Japanese Patent Applications No. 2009-209303 filed on Sep. 10, 2009 and No. 2010-192766 filed on Aug. 30, 2010, of which the contents are incorporated herein by reference.

BACKGROUND OF THE INVENTION

1. Field of the Invention

The present invention relates to a color value acquiring method, a color value acquiring apparatus, an image processing method, an image processing apparatus, and a recording medium, for making color adjustment of a print based on identification information of a color patch selected as a color that is closest to a designated color, from a color chart having a plurality of color patches containing a reference color.

2. Description of the Related Art

With significant advances in inkjet technology in recent years, it has become possible for inkjet printers to produce large color prints of high quality at high speeds. Inkjet printers are not only popular for private or home use, but nowadays also are widely used in commercial applications. Inkjet printers make it possible to print on POP (point of purchase) posters, wall posters, large-size mediums such as outdoor advertisements and billboards, roll mediums, and thick hard mediums.

There are a wide variety of print mediums (hereinafter also referred to as "mediums") available for use in prints to meet various commercial demands. For example, such print mediums include paper mediums, such as synthetic paper, thick paper, aluminum-evaporated paper, etc., resin mediums such as those made of vinyl chloride, PET, etc., and tarpaulin paper made of woven fiber cloth with synthetic resin films applied to both surfaces thereof.

Since advertisement prints are expected to be effective to arouse consumers' motivation to buy advertised products through visual sensations of the consumer, the color finish of such prints is of particular importance. Heretofore, there have been disclosed various color matching technologies, such as a method of generating an ICC (International Color Consortium) profile, a method of adjusting a designated color, etc., as a print color managing means. Such color matching technologies are applicable not only to inkjet printers but also to all types of digital printers, including those based on electrophotographic and thermosensitive principles, together with their peripheral devices across the board.

The method of adjusting a designated color referred to above comprises a method of making fine color adjustments of an area of interest in an image in order to bring the color into substantial conformity with a given color (designated color) designated by a color sample of color chips, while maintaining the color balance of the image as a whole. There have been disclosed various methods of adjusting a designated color.

For example, Japanese Laid-Open Patent Publication No. 2000-217007 discloses a method of bringing the impression of a designated color displayed on a display device and the impression of a color printed by a printing machine into conformity with each other. Specifically, Japanese Laid-Open Patent Publication No. 2000-217007 discloses a display window displayed on the display device, in which the displayed color is changeable, and a printed color chart of 27 colors, which are thought to be close to a designated color that is displayed (see FIGS. 4 and 5 of Japanese Laid-Open Patent Publication No. 2000-217007).

Also, in Japanese Laid-Open Patent Publication No. 2000-217007, the operator sets a designated color that is to be displayed in the display window, presses a print button to print the color chart on the printing machine, selects one of the 27 colors of the color chart, which is closest to the designated color, and enters the number of the closest color into the display device, for thereby strictly approximating the impression of the designated color displayed in the display window by the impression of the color printed on the printing machine.

The 14th color at the center of the color chart of 27 colors represents a color of C, M, Y values that corresponds to the designated color, whereas the other colors of the color chart have C, M, Y components that are slightly different from each other by small quantities $\Delta C$, $\Delta M$, $\Delta Y$ (see FIG. 7 of Japanese Laid-Open Patent Publication No. 2000-217007).

Prints produced by inkjet printers may not endure in severe environments because the images thereof are not highly durable, particularly in terms of abrasion resistance and toughness. For example, such prints are used for sign-display.

Specifically, in exhibition sites that are exposed to high intensity radiant light at all times, color images of displayed prints tend to become gradually discolored because the dyes included in the inks are gradually decomposed by chemical reactions. Also, in display modes where prints are applied to indoor floors, color images of the prints are likely to become damaged because the print surfaces become abraded by people walking on the floors.

Attempts have been made to increase the durability of print images in such applications by covering the image-formed surfaces of prints with protective films such as laminate films, which are functionally treated by the addition of an ultraviolet absorbent, or through an embossing process. The thus-obtained print will be hereinafter referred to as "a protective-film-covered print".

However, the results of investigation and research conducted by the inventor of the present invention have indicated that, although the laminate film has high transmittance, the spectral transmittance thereof is not necessarily flat within a visible wavelength range, and hence the appearance of printed color images that are covered with the laminate film tends to vary to a non-negligible extent, depending on whether the print is covered with a laminate film or not. It also has been discovered that there are many types of commercially available laminate films, which exhibit different spectral transmittances.

In the method and the apparatus disclosed in Japanese Laid-Open Patent Publication No. 2000-217007, various prints having various laminate films covering image-formed surfaces thereof (i.e., various protective-film-covered prints) have to be visually evaluated, in order to adjust a designated color with respect to a protective-film-covered print. However, if colors are to be strictly adjusted with respect to all combinations of laminate films and prints, then it becomes highly tedious and time-consuming to prepare such samples. Further, repetition of such process results in waste of material cost of the laminate film, disadvantageously.

Also, it is well known that appearance of a print varies depending on the spectral radiance distribution of an observational light source. Similarly, in order to adjust a designated color with respect to a print that is exhibited out of doors, the print has to be visually evaluated under the light source of the exhibition site. In this case, with each printing, the printed color chart has to be carried to the exhibition site, which is highly tedious.

SUMMARY OF THE INVENTION

An object of the present invention is to provide a color value acquiring method, a color value acquiring apparatus, an image processing method, an image processing apparatus, and a recording medium, which are capable of significantly reducing the number of processes and material cost derived from laminating operation of a protective film and transferring operation to an exhibition site without reduction in the accuracy of color reproduction.

According to the present invention, there is provided a color value acquiring method comprising a first inputting step of inputting a type of print medium and a type of protective film, a data acquiring step of acquiring color reproduction data of a print obtained by forming an image on a print medium corresponding to the input type of print medium, and spectral data of a protective film corresponding to the input type of protective film, a reference color determining step of determining a reference color based on color information of a designated color to be reproduced on a protective-film-covered print obtained by laminating the protective film on the print, a reference color converting step of converting the determined reference color into another reference color depending on the print without the protective film laminated thereon, based on the acquired color reproduction data of the print and the acquired spectral data of the protective film, a printing step of printing a color chart including a plurality of color patches, based on a plurality of color values depending on the converted other reference color or colors close to the other reference color, a second inputting step of inputting identification information of a color patch, the color patch having been selected, from the printed color chart, as a color that is closest to the designated color, under a condition where the protective film is not laminated, and a color value acquiring step of acquiring a selected color value that is a color value depending on the selected color patch, based on the input identification information.

According to the present invention, there is provided a color value acquiring method comprising a first inputting step of inputting a type of print medium and a type of observational light source, a data acquiring step of acquiring color reproduction data of a print obtained by forming an image on a print medium corresponding to the input type of print medium, and spectral data of an observational light source corresponding to the input type of observational light source, a reference color determining step of determining a reference color based on color information of a designated color to be reproduced on the print under the observational light source, a reference color converting step of converting the determined reference color into another reference color depending on a certain light source that is different from the observational light source, based on the acquired color reproduction data of the print and the acquired spectral data of the observational light source, a printing step of printing a color chart including a plurality of color patches, based on a plurality of color values depending on the converted other reference color or colors close to the other reference color, a second inputting step of inputting identification information of a color patch, the color patch having been selected as a color that is closest to the designated color from the printed color chart under the certain light source, and a color value acquiring step of acquiring a selected color value that is a color value depending on the selected color patch, based on the input identification information.

According to the present invention, there is provided a color value acquiring apparatus comprising a first input section for inputting a type of print medium and a type of protective film, a data acquiring unit for acquiring color reproduction data of a print obtained by forming an image on a print medium corresponding to the type of print medium input by the first input section, and spectral data of a protective film corresponding to the type of protective film input by the first input section, a reference color determining unit for determining a reference color based on color information of a designated color to be reproduced on a protective-film covered print obtained by laminating the protective film on the print, a reference color converter for converting the reference color determined by the reference color determining unit into another reference color depending on the print without the protective film laminated thereon, based on the color reproduction data of the print and the spectral data of the protective film acquired by the data acquiring unit, a print controller for controlling a printing machine to print a color chart including a plurality of color patches, based on a plurality of color values depending on the other reference color converted by the reference color converter or colors close to the other reference color, a second input section for inputting identification information of a color patch, the color patch having been selected, from the color chart printed by the printing machine, as a color that is closest to the designated color, under a condition where the protective film is not laminated, and a color value acquiring unit for acquiring a selected color value that is a color value depending on the selected color patch, based on the identification information input by the second input section.

According to the present invention, there is provided an image processing method comprising a first inputting step of inputting a type of print medium and a type of protective film, a data acquiring step of acquiring color reproduction data of a print obtained by forming an image on a print medium corresponding to the input type of print medium, and spectral data of a protective film corresponding to the input type of protective film, a reference color determining step of determining a reference color based on color information of a designated color to be reproduced on a protective-film covered print obtained by laminating the protective film on the print, a reference color converting step of converting the determined reference color into another reference color depending on the print without the protective film laminated thereon, based on the acquired color reproduction data of the print and the acquired spectral data of the protective film, a printing step of printing a color chart including a plurality of color patches, based on a plurality of color values depending on the converted other reference color or colors close to the other reference color, a second inputting step of inputting identification information of a color patch, the color patch having been selected, from the printed color chart, as a color that is closest to the designated color, under a condition where the protective film is not laminated, a first color value acquiring step of acquiring a color value depending on the selected color patch as a first color value, based on the input identification information, a second color value acquiring step of acquiring a color value of the designated color as a second color value, and a color adjusting step of adjusting colors of the print to be covered with the protective film, based on the acquired first and second color values.

According to the present invention, there is provided an image processing apparatus comprising a first input section for inputting a type of print medium and a type of protective film, a data acquiring unit for acquiring color reproduction data of a print obtained by forming an image on a print medium corresponding to the type of print medium input by the first input section, and spectral data of a protective film corresponding to the type of protective film input by the first input section, a reference color determining unit for determining a reference color based on color information of a designated color to be reproduced on a protective-film covered print obtained by laminating the protective film on the print, a reference color converter for converting the reference color determined by the reference color determining unit into another reference color depending on the print without the protective film laminated thereon, based on the color reproduction data of the print and the spectral data of the protective film acquired by the data acquiring unit, a print controller for controlling a printing machine to print a color chart including a plurality of color patches, based on a plurality of color values depending on the other reference color converted by the reference color converter or colors close to the other reference color, a second input section for inputting identification information of a color patch, the color patch having been selected, from the color chart printed by the printing machine, as a color that is closest to the designated color, under a condition where the protective film is not laminated, a first color value acquiring unit for acquiring a color value depending on the selected color patch as a first color value, based on the identification information input by the second input section, a second color value acquiring unit for acquiring a color value of the designated color as a second color value, and a color adjusting section for adjusting colors of the print to be covered with the protective film, based on the first color value acquired by the first color value acquiring unit and the second color value acquired by the second color value acquiring unit.

According to the present invention, there is provided a computer-readable recording medium storing a program for enabling a computer to function as a first input section for inputting a type of print medium and a type of protective film, a data acquiring unit for acquiring color reproduction data of a print obtained by forming an image on a print medium corresponding to the input type of print medium, and spectral data of a protective film corresponding to the input type of protective film, a reference color determining unit for determining a reference color based on color information of a designated color to be reproduced on a protective-film covered print obtained by laminating the protective film on the print, a reference color converter for converting the determined reference color into another reference color depending on the print without the protective film laminated thereon, based on the acquired color reproduction data of the print and the acquired spectral data of the protective film, a print controller for controlling a printing machine to print a color chart including a plurality of color patches, based on a plurality of color values depending on the converted other reference color or colors close to the other reference color, a second input section for inputting identification information of a color patch, the color patch having been selected, from the printed color chart, as a color that is closest to the designated color, under a condition where the protective film is not laminated, and a color value acquiring unit for acquiring a selected color value that is a color value depending on the selected color patch, based on the input identification information.

With the image processing apparatus, the image processing method and the recording medium according to the present invention, a type of print medium and a type of protective film are input. Color reproduction data of a print produced by forming an image on a print medium corresponding to the input type of print medium, and spectral data of a protective film corresponding to the input type of protective film are acquired. A reference color is determined based on color information of a designated color to be reproduced on a protective-film-covered print produced by laminating the protective film on the print. Based on the acquired color reproduction data of the print and the acquired spectral data of the protective film, the determined reference color is converted into another reference color depending on the print without the protective film laminated thereon. Based on a plurality of color values depending on the converted other reference color or colors close to the other reference color, a color chart having a plurality of color patches is printed. Identification information of a color patch that has been selected as a color that is closest to the designated color from the printed color chart, under a condition where the protective film is not laminated, is input. Then, a color value depending on the selected color patch is acquired as a selected color value, based on the input identification information. Thus, a designated color for a protective-film-covered print can be adjusted without the need of laminating the protective film on the color chart, and it is possible to significantly reduce the number of processes and material cost derived from the laminating process of the protective film.

Also, with the color value acquiring apparatus according to the present invention, a type of print medium and a type of observational light source are input. Color reproduction data of a print produced by forming an image on a print medium corresponding to the input type of print medium, and spectral data of an observational light source corresponding to the input type of observational light source are acquired. Based on color information of a designated color to be reproduced on the print under the observational light source, a reference color is determined. Based on the acquired color reproduction data of the print and the acquired spectral data of the observational light source, the determined reference color is converted into another reference color depending on a certain light source different from the observational light source. Based on a plurality of color values depending on the converted other reference color or colors close to the other reference color, a color chart including a plurality of color patches is printed. Identification information of a color patch that has been selected as a color that is closest to the designated color from the printed color chart, under the certain light source, is input. Then, based on the input identification information, a color value depending on the selected color patch is acquired as a selected color value. Thus, a designated color can be adjusted without the need of transferring to a site under another observational light source, and it is possible to significantly reduce the number of processes derived from the transferring operation.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a view showing, by way of example, a setting screen for adjusting a designated color according to the embodiment;

FIG. 7 is a flowchart for carrying out an image processing method according to the present embodiment;

FIG. 8 is a flowchart of a profile changing process according to the embodiment;

FIG. 10 is a view showing, by way of example, a screen which displays a result of selection of color.

DESCRIPTION OF THE PREFERRED EMBODIMENTS

A color value acquiring method (or image processing method) according to a preferred embodiment of the present invention in relation to a color value acquiring apparatus (or image processing apparatus), and a printing system for carrying out the image processing method, will be described in detail below with reference to the accompanying drawings.

Figure 1:
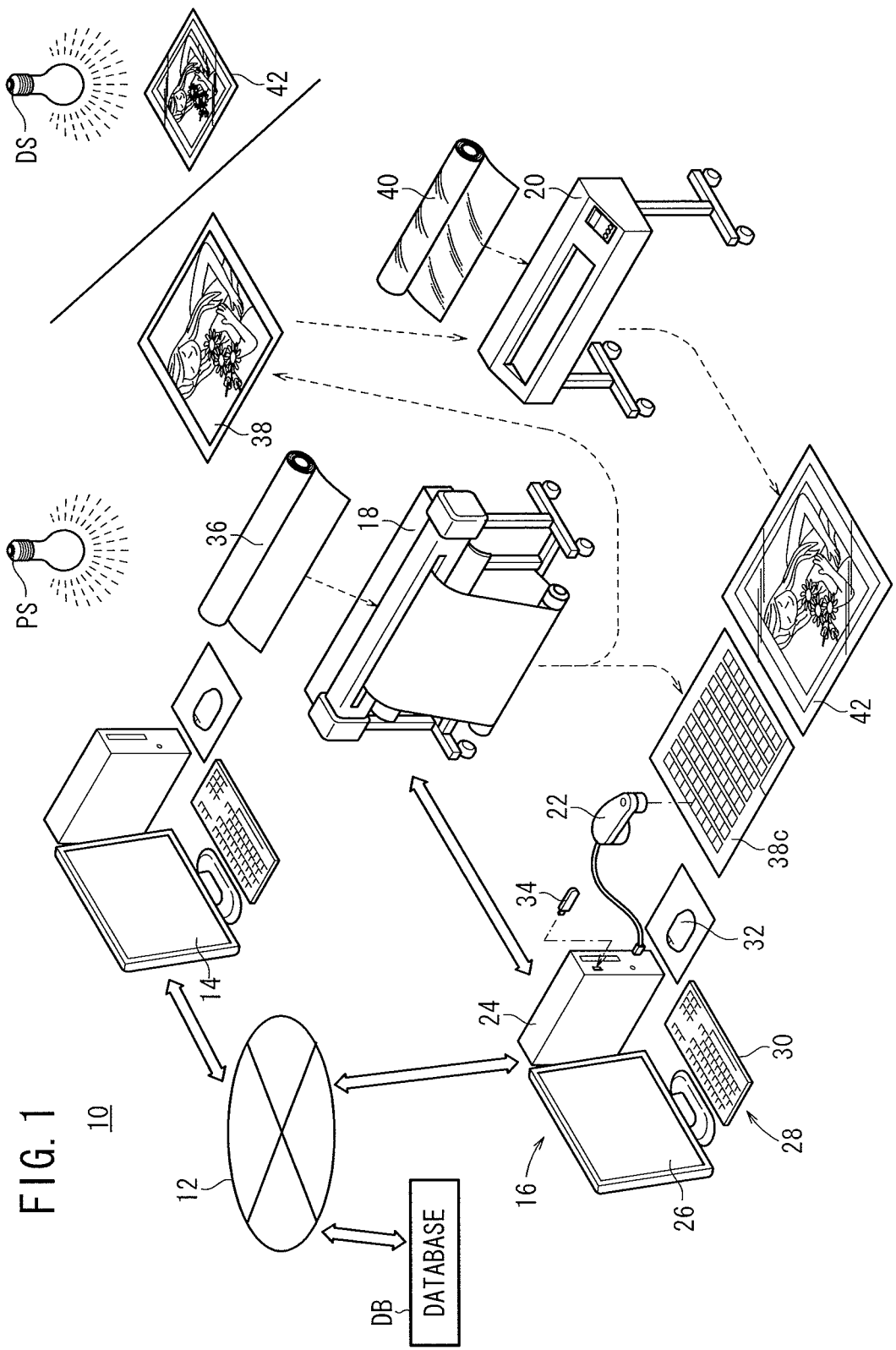
FIG. 1 is a perspective view of a printing system incorporating an image processing apparatus according to an embodiment of the present invention.

FIG. 1 shows in perspective a printing system 10 incorporating an image processing apparatus 16 according to an embodiment of the present invention.

As shown in FIG. 1, the printing system 10 basically comprises a network 12, an editing apparatus 14, the image processing apparatus 16 (color value acquiring apparatus, image processing apparatus), a printing machine 18, a laminating apparatus 20, and a colorimeter 22.

The network 12 is an information communication linkage constructed according to communication standards such as Ethernet (registered trademark) or the like. The editing apparatus 14, the image processing apparatus 16, and a database DB are connected to each other over the network 12 by a wired or wireless link. The editing apparatus 14 is capable of editing an arrangement of color images made up of characters, figures, pictures, photos, etc., on each of pages to be printed. The editing apparatus 14 generates electronic manuscripts (print data) in a page description language (hereinafter referred to as "PDL"), e.g., 8-bit image data in color channels consisting of four colors (C, M, Y, K) or three colors (R, G, B).

PDL refers to a language that is descriptive of image information, including format information, positional information, color information (including density information), etc., of characters, figures, etc., in a "page" that serves as an output unit for printing, displaying, or the like. Known types of PDL include PDF (Portable Document Format according to ISO32000-1:2008), PostScript (registered trademark) of Adobe Systems Incorporated, and XPS (XML Paper Specification).

A color scanner, not shown, is connected to the editing apparatus 14. The color scanner is capable of optically reading a color original, which is set in position. Therefore, the editing apparatus 14 can acquire color image data in the form of an electronic manuscript from the color scanner based on the color original read thereby.

The image processing apparatus 16 converts an electronic manuscript described by PDL into a raster image (e.g., bitmap image), which will be described later, and then performs a desired image processing process, e.g., a color conversion process, an image scaling process, an image arranging process, etc., on the image data, converts the processed image data into a print control signal that matches the printing process of the printing machine 18, and sends the print control signal to the printing machine 18.

The image processing apparatus 16 comprises a main unit 24 including a CPU, a memory, etc., a display device 26 for displaying color images, and an input device 28 as an input unit including a keyboard 30 and a mouse 32. A portable memory 34, which is capable of freely recording and erasing electronic data, and the colorimeter 22 are connected to the main unit 24 of the image processing apparatus 16.

The printing machine 18 comprises an inkjet printing apparatus for producing a color image based on a combination of standard inks of colors C, M, Y, K (process colors) and optional inks of light colors such as LC, LM, etc., and W (white). The printing machine 18 controls propulsion of inks onto a print medium 36 (a rolled non-printed medium as shown in FIG. 1) based on print control signals received from an external apparatus, e.g., the image processing apparatus 16, in order to print a color image on the print medium 36, thereby producing a printed object (print) 38, which may include a designated color adjusting color chart 38c.

The laminating apparatus 20 applies a laminate film 40 as a protective film to the image-formed surface of the printed object 38 and, if necessary, to the reverse surface thereof. The laminating apparatus 20 then heats and presses the laminate film 40 onto the printed object 38 with a heating roller, not shown, thereby producing a protective-film-covered print 42 in which the image-formed surface of the printed object 38 is protected by the laminate film 40.

The print medium 36 may comprise a paper medium such as synthetic paper, thick paper, aluminum-evaporated paper or the like, a resin medium such as vinyl chloride, PET or the like, or tarpaulin paper or the like. The protective film, which is applied to the printed object 38, is not limited to a laminate film 40, but may be formed from a liquid, a varnish, a transparent ink, a clear toner or the like, or may comprise a protective sheet such as an acrylic sheet or the like.

The colorimeter 22 colorimetrically measures an object to be measured and then acquires color values of the object to be measured. Color values refer not only to tristimulus values X, Y, Z, the coordinates L*, a*, b* of a uniform color space, etc., but also to a distribution of optical material characteristic values (hereinafter referred to as "spectral data") with respect to wavelengths, e.g., a spectral radiance distribution, a spectral sensitivity distribution, spectral reflectivity, spectral transmittance, spectral diffusion coefficient and spectral specific reflectivity.

The protective-film-covered print 42, which is obtained in this manner, is displayed and observed at a given site under a light source DS (another observational light source) whose spectral radiance distribution is different from a light source PS (a predetermined observational light source) of the printing system 10.

Figure 2:
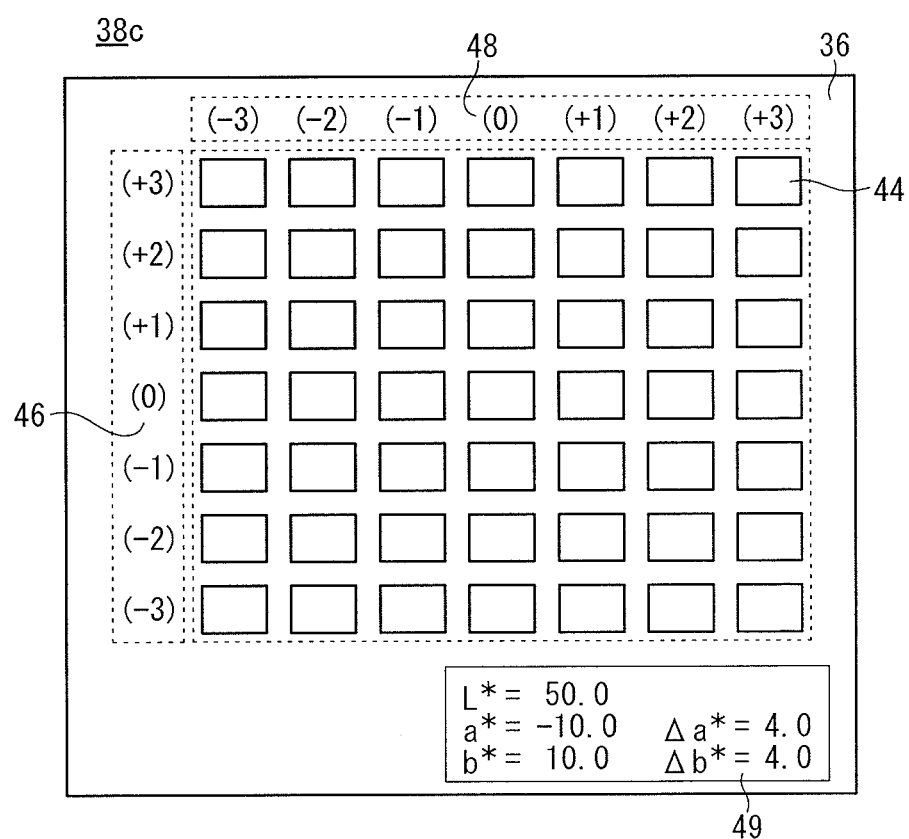
FIG. 2 is a front elevational view of designated color adjusting color charts according to the embodiment.

FIG. 2 is a front elevational view of a designated color adjusting color chart 38c.

The designated color adjusting color chart 38c shown in FIG. 2 comprises 49 color patches 44 made up of different colors, which are substantially identical in shape, row numbers 46 (identification information) and column numbers (identification information) for identifying the positions of the color patches 44 along the directions of rows and columns, and print information 49, i.e., information regarding conditions for printing the color chart 38c, all of which are printed on the print medium 36.

The color patches 44 are arranged in a matrix having 7 vertical columns and 7 horizontal rows, the color patches 44 being spaced from each other by given intervals. Colors of the respective color patches 44 are set to given values in a range of signal levels of C, M, Y, K values (a percentage range from 0% to 100% or an 8-bit gradation range from 0 to 255).

The row numbers 46, which serve as identification information, represent a vertical string of characters ranging from (+3) to (−3) positioned in alignment with and to the left of the respective rows of the color patches 44. The column numbers 48, which also serve as identification information, represent a horizontal string of characters ranging from (−3) to (+3) positioned in alignment with and at the top of the respective columns of the color patches 44.

The print information 49 is positioned in a lower portion of the color chart 38c, representing the values of L*, a*, b*, Δa*, and Δb*.

Figure 3:
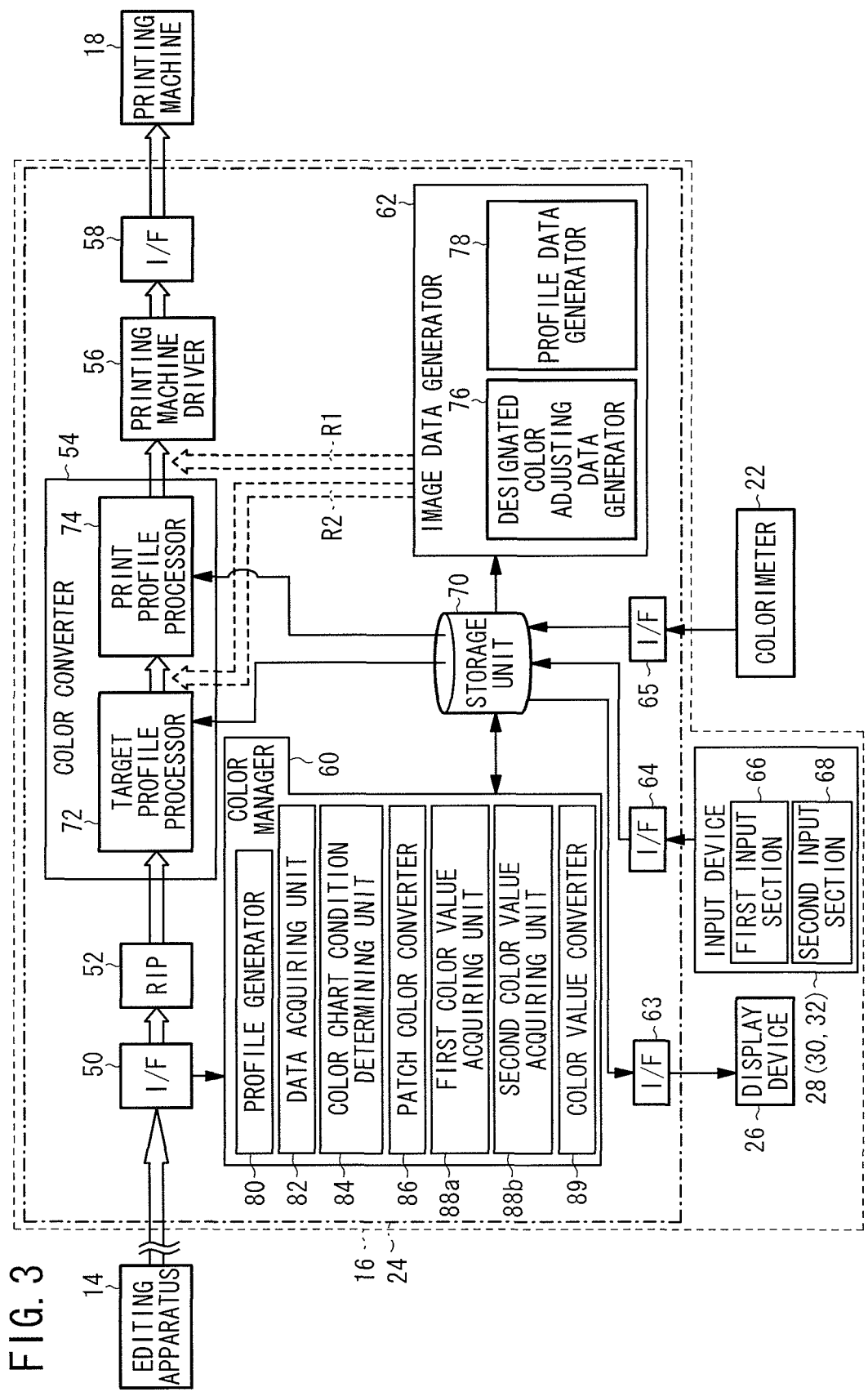
FIG. 3 is a functional block diagram of the image processing apparatus according to the embodiment.

FIG. 3 is a functional block diagram of the image processing apparatus 16 according to the present embodiment. In FIG. 3, an electronic manuscript is supplied along directions indicated by the outlined solid-line arrows, color-chart image data is supplied along directions indicated by the outlined broken-line arrows, and various other data is supplied along directions indicated by the solid-line arrows.

As shown in FIG. 3, the main unit 24 of the image processing apparatus 16 includes an I/F 50 for entering an electronic manuscript supplied from the editing apparatus 14, a RIP (Raster Imaging Processor) 52 for converting the PDL format of the electronic manuscript supplied from the I/F 50 into a raster format, a color converter (color adjusting section) 54 for performing a color converting process on the converted C, M, Y, K values (or R, G, B values) of the electronic manuscript from the RIP 52 in order to produce image data made up of new C, M, Y, K values, a printing machine driver (print controller) 56 for converting the image data of the new C, M, Y, K values produced by the color converter 54 into a print control signal (ink propulsion control data) that matches the printing process of the printing machine 18, and an I/F 58 for outputting the print control signal generated by the printing machine driver 56 to the printing machine 18.

The main unit 24 also includes a color manager 60 for managing profiles of different printing machines 18, an image data generator 62 for generating image data to print the designated color adjusting color chart 38c or a profile color chart, not shown, an I/F 63 connected to the display device 26, an I/F 64 connected to the input device 28 including the mouse 32 and the keyboard 30, and an I/F 65 connected to the colorimeter 22.

The input device 28 functions as a first input section 66 for inputting a type of print medium 36, a type of laminate film 40 and a type of light source DS into the main unit 24, and also as a second input section 68 for inputting identification information (including the row numbers 46 and the column numbers 48) of the selected color patch 44 into the main unit 24.

The main unit 24 also includes a storage unit 70 for storing various data supplied from various components of the main unit 24, and for supplying stored data to various components of the main unit 24. The storage unit 70 is connected to the RIP 52, the color converter 54, the color manager 60, the image data generator 62, the I/F 63, the I/F 64, and the I/F 65.

The color converter 54 comprises a target profile processor 72 for converting device-dependent data into device-independent data, and a print profile processor 74 for converting device-independent data into device-dependent data. Device-dependent data refer to data defined in terms of C, M, Y, K values, R, G, B values, or the like, for appropriately driving various devices. Device-independent data refer to data defined in terms of a display system, such as an HSL system, an HSB system, a CIELAB coordinate system, a CIELUV coordinate system, an XYZ system, or the like.

The image data generator 62 comprises a designated color adjusting data generator (image data generator) 76 for generating image data to print the designated color adjusting color chart 38c, and a profile data generator 78 for generating image data to print the profile color chart (not shown).

The color manager 60 comprises a profile generator 80 for generating and correcting profiles for respective printing machines 18, a data acquiring unit 82 for acquiring color reproduction data of the print 38, spectral data of the laminate film 40 or spectral data of the light source DS, a color chart condition determining unit (reference color determining unit) 84 for determining color chart conditions (reference colors, color difference intervals), to be described later, a patch color converter 86 (patch color converting section, reference color converter) for converting a color of the color patch 44 into a color appropriate for a given simulation environment, a first color value acquiring unit 88a for acquiring a selected color value (or a first color value), i.e., a color value corresponding to the selected color patch 44, a second color value acquiring unit 88b for acquiring a color value (second color value) of a designated color, and a color value converter 89 for converting selected color values (device-independent data) into C, M, Y, K values (device-dependent data) using a print profile of the printing machine 18 and thereby acquiring color values to be displayed for confirmation of results of color selection.

The color reproduction data refer to various data used for performing an appropriate color reproduction on an output device. For example, the color reproduction data includes data (including color-conversion table of ICC profile) representative of a correspondence relation between device-dependent data and device-independent data, or the above-described spectral data, etc.

The RIP 52 can perform various image processing processes including an image scaling process depending on the resolution, etc., of the printing machine 18, and a rotating and inverting process depending on a printing format when an electronic manuscript is converted into raster image data.

The printing machine driver 56 generates ink propulsion control data corresponding to ink colors (C, M, Y, K, LC, LM, or W) from C, M, Y, K values. The ink propulsion control data are used for properly controlling the ejection of the inks (ink ejection ON/OFF, ink dot diameters, etc.) of the printing machine 18. The printing machine driver 56 may generate the ink propulsion control data according to a known algorithm, such as a dither matrix method, an error diffusion method, or the like, although it requires conversion from an 8-bit multiple-gradation image into a low-gradation image such as a binary image.

The target profile processor 72 or the print profile processor 74 is capable of correcting profiles depending on a print mode of the printing machine 18. The print mode refers to various print settings, such as the number of nozzles of the print head, the timing (unidirectional/bidirectional) of ink ejection during scanning of the print head, the number of passes, the number and type of inks used on the printing machine 18, the algorithm for generating ink ejection control data, etc.

The main unit 24 has a controller (not shown) comprising a CPU, etc., for controlling all of the image processing processes described above. More specifically, the controller controls not only operations of various components of the main unit 24, e.g., reading data from and writing data to the storage unit 70, but also transmission of display control signals via the I/F 63 to the display device 26, and acquisition of colorimetric data from the colorimeter 22 via the I/F 65.

The image processing apparatus 16 according to the present embodiment is constructed basically as described above. The image processing processes or functions described above can be performed according to application software (programs) stored in the storage unit 70, for example, which operates according to basic software (operating system).

The aforementioned program is recorded in a computer readable recording medium (for example, the portable memory 34 shown in FIG. 1). The program, which is stored in the recording medium, may be read in and executed by a computer system. The term "computer system" as used herein may include an OS (operating system) or hardware embodied in peripheral devices or the like. Such a computer readable medium may be a portable storage device such as a flexible disk, magneto-optical disk, ROM, CD-ROM or the like, or a hard disk that is internal to the computer system. The computer readable medium may hold programs dynamically and for a short time period, as in the case of a transmission line, in which programs are transmitted to the computer over a communications circuit made up of an Internet network, a telephone circuit line, or the like, and may include holding of programs for a certain length of time, as in the case of a volatile memory internal to a server/client type of computer system.

Figure 4:
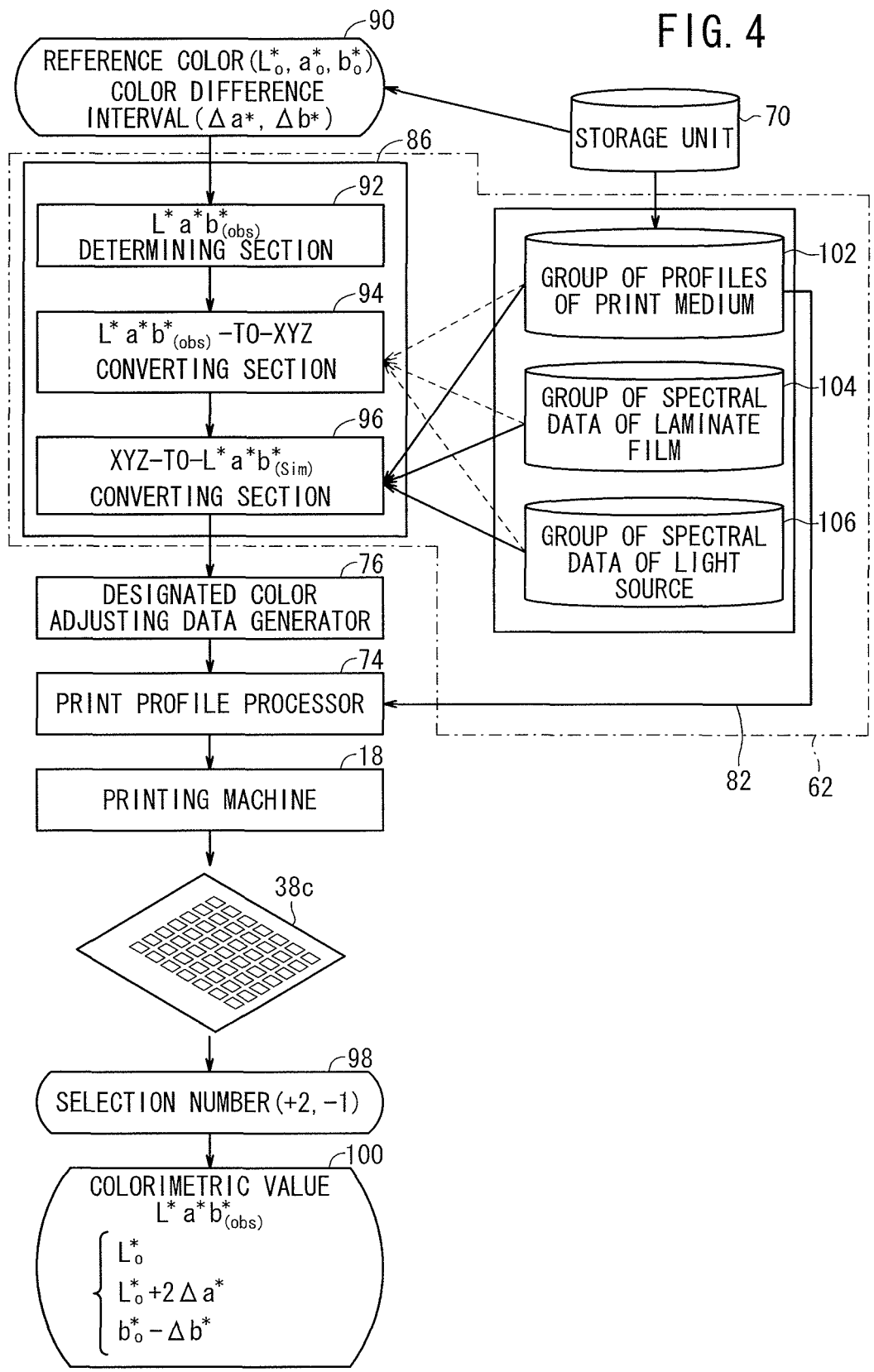
FIG. 4 is a view showing a process flow for obtaining color value data from color chart condition data.

FIG. 4 is a view showing a process flow for acquiring color value data 100 from color chart condition data 90. In FIG. 4, L*a*b*(obs) represents L*a*b* under an actual exhibition condition, whereas L*a*b*(sim) represents L*a*b* under a print simulation.

The process flow is performed by an L*a*b*(obs) determining section 92 for determining L*a*b*(obs) of colors of 49 color patches 44 based on color chart condition data 90 supplied from the storage unit 70, an L*a*b*(obs)-to-XYZ converting section 94 for converting the L*a*b*(obs) determined by the L*a*b*(obs) determining section 92 into XYZ based on data under an actual exhibition condition, an XYZ-to-L*a*b*(sim) converting section 96 for converting the XYZ produced by the L*a*b*(obs)-to-XYZ conversion section 94 into L*a*b*(sim) based on data under a print simulation, a designated color adjusting data generator 76 for generating image data of L*a*b* values based on the L*a*b* (sim) produced by the XYZ-to-L*a*b*(sim) converting section 96, a print profile processor 74 for converting the image data of L*a*b* values generated by the designated color adjusting data generator 76 into image data of CMYK values, and a printing machine 18 for producing a desired print based on the image data of CMYK values produced by the print profile processor 74. The patch color converter 86 includes the L*a*b*(obs) determining section 92, the L*a*b* (obs)-to-XYZ converting section 94, and the XYZ-to-L*a*b* (sim) converting section 96.

Thereafter, one color patch 44 is selected from the designated color adjusting color chart 38c obtained by the printing machine 18. Then, the selection number 98 corresponding to the one color patch 44 is obtained, and the color value data 100 corresponding to the selection number 98, i.e., L*a*b* (obs), is obtained.

A group 102 of profiles of print mediums, a group 104 of spectral data of laminate films, and a group 106 of spectral data of light sources are supplied from the storage unit 70 to the data acquiring unit 82.

Then, data under the actual exhibition condition, i.e., a profile of a print medium 36, spectral data of a laminate film 40, and spectral data (spectral radiance distribution in actual) of a light source DS, depending on given types thereof, are supplied to the L*a*b*(obs)-to-XYZ converting section 94, as indicated by the dashed arrow in FIG. 4. Also, data under the print simulation, i.e., a profile of the print medium 36, spectral data of the laminate film 40, and spectral data of the light source DS, depending on the given type, are supplied to the XYZ-to-L*a*b*(sim) converting section 96, as indicated by the solid arrow in FIG. 4. Further, a profile of the print medium 36 depending on the given type is supplied to the print profile processor 74, if necessary, as indicated by the solid arrow.

FIG. 5 shows by way of example a setting screen for adjusting a designated color according to the present embodiment.

The setting screen 110, which is displayed on the display device, includes in a lefthand area thereof a two-dimensional matrix of 49 radio buttons 112, and a numeral string 114 disposed around the radio buttons 112.

The setting screen 110 includes in an upper righthand area thereof a vertical array of 3 radio buttons 116, and a horizontal array of 3 radio buttons 118. The radio buttons 116 in the vertical array are associated with respective letters L*, a*, b* disposed to the left of the radio buttons 116. The radio buttons 118 in the horizontal array are associated with respective letters L*, a*, b* disposed above the radio buttons 118.

On the further right side, there are provided a pull-down menu 120 for selecting a print profile, and a display window 122 in which a type of print medium 36, a type of laminate film 40 and a type of light source DS are displayed.

The setting screen 110 includes in a central righthand area thereof two (i.e., left and right) display windows 124, 126. The display window 124 displays color values L*, a*, b*, while the display window 126 displays color values ΔL*, Δa*, Δb*.

The setting screen 110 includes in a lower righthand area thereof buttons 128, 130, 132 displaying "NEXT PRINT", "FINALIZE", and "CANCEL", respectively, successively from left to right.

Figure 6A:
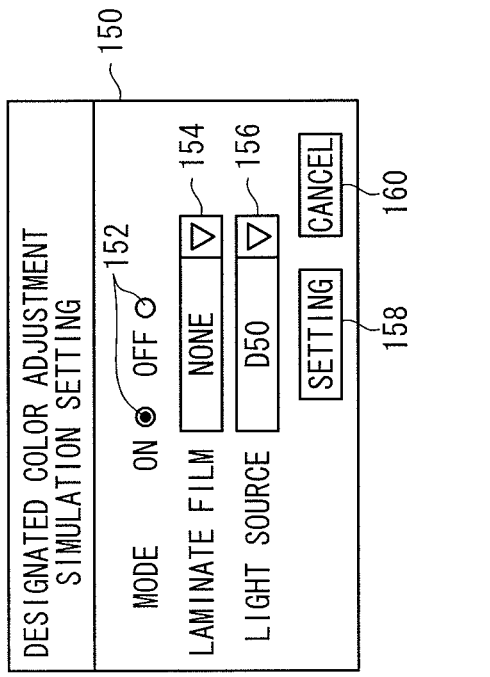
FIG. 6A is a view showing, by way of example, a setting screen for setting profile generating conditions according to the present embodiment.

FIG. 6A is a view showing by way of example a setting screen for setting profile generating conditions according to the present embodiment.

A setting screen 134 has three pull-down menus 136, 138, 140, a textbox 142, and buttons 144, 146 labeled "GENERATE" and "CANCEL", respectively, arranged successively downward.

The setting screen 134 includes a string of letters indicating "MEDIUM" on the left side of the pull-down menu 136. When the operator operates the mouse 32 in a certain way, a selection column (not shown) also is displayed beneath the pull-down menu 136.

The setting screen 134 includes a string of letters indicating "LAMINATE FILM" on the left side of the pull-down menu 138. When the operator operates the mouse 32 in a certain way, a selection column (not shown) also is displayed beneath the pull-down menu 138.

The setting screen 134 includes a string of letters indicating "LIGHT SOURCE" on the left side of the pull-down menu 140. When the operator operates the mouse 32 in a certain way, a selection column (not shown) also is displayed beneath the pull-down menu 140.

The setting screen 134 includes a string of letters indicating "PROFILE NAME" on the left side of the textbox 142. The operator can enter character information into the textbox 142 through operation of the keyboard 30.

Figure 6B:
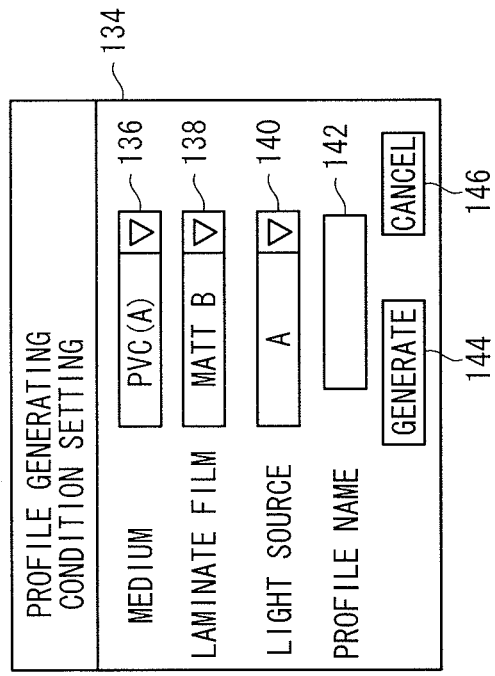
FIG. 6B is a view showing, by way of example, a setting screen for designated color adjustment simulation according to the present embodiment.

FIG. 6B is a view showing by way of example a setting screen for a designated color adjustment simulation according to the present embodiment.

A setting screen 150 has two radio buttons 152, two pull-down menus 154, 156, and buttons 158, 160 labeled "SETTING" and "CANCEL", respectively, arranged successively downward.

On the left side of the radio buttons 152, there are displayed "ON" and "OFF", any one of which can be selected.

The setting screen 150 includes a string of letters indicating "LAMINATE FILM" on the left side of the pull-down menu 154. When the operator operates the mouse 32 in a certain way, a selection column (not shown) also is displayed beneath the pull-down menu 154.

The setting screen 150 includes a string of letters indicating "LIGHT SOURCE" on the left side of the pull-down menu 156. When the operator operates the mouse 32 in a certain way, a selection column (not shown) also is displayed beneath the pull-down menu 156.

The printing system 10 basically is constructed as described above. Operations of the printing system 10 will be described below.

FIG. 7 is a flowchart for carrying out a profile generating method according to the present embodiment. An explanation thereof will be made below mainly with reference to FIG. 1.

The operator examines printing conditions and observational manners of a protective-film-covered print 42 to be produced (step S1). Such printing conditions refer to the type of printing machine 18 that is used to produce the protective-film-covered print 42, the type of print medium 36, the type of laminate film 40, and the print mode referred to above, etc. Observational manners refer not only to attributes (type of light source, spectral data) of the light source DS as an observational light source, but also to the type of image on the protective-film-covered print 42 to be observed. The type of image refers to a reflective image (an image observed with a reflective light source used as a main light source), a transmissive image (an image observed with a transmissive light source used as a main light source), and a combination image (an image observed with a reflective light source and a transmissive light source used as main light sources).

Then, the operator selects a profile suitable for the printing machine 18 (step S2). Normally, a target profile or a print profile is stored in the storage unit 70 of the main unit 24. If a profile suitable for the printing machine 18 has not been registered, i.e., is not stored in the storage unit 70, then a print profile can be generated separately.

Then, an electronic manuscript is printed using the printing machine 18, thereby producing a printed object 38 (step S3). Thereafter, the printed object 38 is laminated (step S3).

More specifically, the laminate film 40 is applied to the image-formed surface of the printed object 38 and, if necessary, the reverse surface thereof. The laminate film 40 then is heated and pressed by a heating roller (not shown) of the laminating apparatus 20, thereby producing a protective-film-covered print 42. The produced protective-film-covered print 42 has an increased level of abrasion resistance and toughness.

Then, the operator evaluates the color image of the protective-film-covered print 42 (step S4), and determines whether or not the color of the color image is appropriate (step S5). The operator may evaluate the color of the color image in order to determine whether desired hues are obtained, for example, either by visually checking the color image based on observation of an overall or partial appearance of the color image, or by obtaining a colorimetric value of a certain area of the protective-film-covered print 42 with the colorimeter 22, and determining whether or not the obtained colorimetric value falls within a desired range.

If, as a result of such image evaluation, the operator judges that the color of the color image of the protective-film-covered print 42 is not suitable, then the operator changes the profile in order to make fine adjustments to the color of the color image (step S6). More specifically, the operator may reset or regenerate the profile, may make fine adjustments to the profile (i.e., may correct the presently set profile), or may make corrections to the print data of the printed electronic manuscript.

Thereafter, an electronic manuscript is printed and colors of the color image itself are evaluated repeatedly (steps S3 through S6) until a protective-film-covered print 42 having a desired color is obtained.

An image processing sequence of the image processing apparatus 16 for generating a profile (step S2) will be described in detail below with reference to FIG. 3.

Image data generated by the profile data generator 78 based on given C, M, Y, K value data stored in the storage unit 70 are supplied from the image data generator 62 via a path R1 to the printing machine driver 56, from which the image data are supplied to the printing machine 18 in the same manner as during printing of an electronic manuscript. Color patches of a profile color chart thus produced, not shown, are measured by the colorimeter 22, which is connected to the image processing apparatus 16, thereby producing color values $L^*$, $a^*$, $b^*$. The color value data thus produced are temporarily stored in the storage unit 70. Thereafter, based on the associative relationship between the designated C, M, Y, K value data and the produced colorimetric values $L^*$, $a^*$, $b^*$, a print profile is generated, which includes a three-dimensional to four-dimensional conversion LUT.

When a profile is generated, various settings can be performed through the setting screen 134 shown in FIG. 6A. In FIG. 6A, "PVC (A)" (where "PVC" refers to polyvinyl chloride") is selected as a type of print medium 36 from the selection column (not shown) of the pull-down menu 136, "MATT B" (where "MATT" refers to a non-glossy film) is selected as a type of laminate film 40 from the selection column (not shown) of the pull-down menu 138, and "A" (light source) is selected as a type of light source DS from the selection column (not shown) of the pull-down menu 140.

Then, the operator enters a string of letters into the text box 142 using the mouse 32 and the keyboard 30, and pushes the "GENERATE" button 144. Thereafter, color values and CMYK values for each color patch, which are stored in the storage unit 70, are read out, the profile generator 80 generates a print profile, and the print profile is stored in the storage unit 70. At this time, if the "CANCEL" button 146 is pushed down, the operation is halted without change of data contents such as a profile.

The pull-down menu 136 may include combinations of types of print mediums 36 and print modes of the printing machine 18 for selection.

An image processing sequence of the image processing apparatus 16 for printing an electronic manuscript (step S3) will be described in detail below with reference to FIG. 2.

When an electronic manuscript in PDL format supplied from the editing apparatus 14 is input to the image processing apparatus 16 via the network 12 and the I/F 50, the electronic manuscript is converted into 8-bit C, M, Y, K raster data (device-dependent image data) by the RIP 52. The 8-bit C, M, Y, K bitmap data then are converted into $L^*$, $a^*$, $b^*$ data (device-independent image data) by the target profile processor 72. The $L^*$, $a^*$, $b^*$ data then are converted into C, M, Y, K value data (device-dependent image data) by the print profile processor 74. The C, M, Y, K value data then are converted into a print control signal (ink ejection control data) by the printing machine driver 56. The print signal is supplied from the printing machine driver 56 via the I/F 58 to the printing machine 18. Thereafter, the printing machine 18 produces a desired print 38 based on the print signal.

Since target profiles and print profiles corresponding to a plurality of set conditions have been stored in the storage unit 70, a target profile is supplied to the target profile processor 72 and a print profile is supplied to the print profile processor 74, selectively, depending on various preset conditions. If the profiles are appropriately corrected in view of the print mode of the printing machine 18, then a more appropriate color conversion process can be performed.

An outline of a process flow for producing an appropriate protective-film-covered print 42 using an image processing method according to the present embodiment, has been described above. Next, a process (step S6) of changing the profile will be described in detail below with reference to a flowchart in FIG. 8.

First, conditions for a simulation are set (step S61). The operator can perform various settings from the setting screen 150 shown in FIG. 6B.

For example, the mode is set to "ON" using the radio button 152, the type of laminate film 40 is set to "NONE" using the pull-down menu 154, and the type of light source PS is set to "D50" using the pull-down menu 156. Then, when the "SETTING" button 158 is pushed down, the above setting conditions are stored in the storage unit 70 (see FIG. 3). In this manner, conditions for a print simulation, to be described later, are set up. If the print simulation is not performed, the operator sets the mode to "OFF" using the radio button 152.

When the operator pushes the "SETTING" button 158 using the mouse 32, the settings on the setting screen 150 are input into the main unit 24 and stored in the storage unit 70. If the "CANCEL" button 160 is pushed down, the operation is halted without change of data contents such as conditions for a simulation.

Then, a reference color and a color difference interval for the designated color adjusting color chart 38c are initialized (step S62). These values can freely be set by the color chart condition determining unit 84 (see FIG. 3). For example, initial values of a reference color ($L^*_0$, $a^*_0$, $b^*_0$) can be determined based on color information of a designated color to be reproduced on the protective-film-covered print 42. The color information refers to various information for specifying a color, which includes not only actual color samples but also color values thereof or typed thereof, etc. The color values of color samples include device-independent data such as tristimulus values X, Y, Z, coordinates L*, a*, b* in a uniform color space, or device-dependent data such as R, G, B values, C, M, Y, K values, etc. The types of color samples include the names of manufactures, the numbers of color samples, etc.

The initial values may be acquired by measuring the actual color sample with the colorimeter 22. Alternatively, color values associated with color numbers of color chips may be stored in advance in the storage unit 70, and may be read from the storage unit 70 for each setting of initial values. Or, initial values of the reference color may be selected using a GUI controller such as a color wheel.

The color difference interval ($\Delta L^*$, $\Delta a^*$, $\Delta b^*$) may be initialized to appropriate values that have been empirically established in color adjustment operations.

Further, as shown in FIG. 5, a print profile for the protective-film-covered print 42 to be finally produced is set through the pull-down menu 120. Upon the setting, the type of print medium 36, the type of laminate film 40 or the type of light source DS, which are displayed on the display window 122, can be referenced.

Next, the designated color adjusting color chart 38c shown in FIG. 2 is printed (step S63). At this time, image data are generated by the designated color adjusting data generator 76 (see FIG. 3) of the image data generator 62. An explanation will be made below also with reference to a process flow shown in FIG. 4.

Based on color chart condition data 90 shown in FIG. 4, the L*a*b*(obs) determining section 92 determines colors, for placing a plurality of color patches 44 of different colors in a two-dimensional pattern.

According to one process of determining colors, one (e.g., L*) of three variables (L*, a*, b*) of the uniform color space CIELAB is fixed, while the other two variables (e.g., a*, b*) are gradually changed at each of the positions of the color patches 44. More specifically, pixel values corresponding to the respective color patches 44 may be determined according to the following equations (1) through (3):

$$L^*_i = L^*_0 + \Delta L^* \times i (i=-3, -2, \ldots, +2, +3) \tag{1}$$

$$a^*_j = a^*_0 + \Delta a^* \times j (j=-3, -2, \ldots, +2, +3) \tag{2}$$

$$b^*_k = b^*_0 + \Delta b^* \times k (k=-3, -2, \ldots, +2, +3) \tag{3}$$

Hereinafter, a color represented by ($L^*_0$, $a^*_0$, $b^*_0$) shall be referred to as a reference color, and ($\Delta L^*$, $\Delta a^*$, $\Delta b^*$) shall be referred to as a color difference interval.

Furthermore, a color area formed by the color patches 44 of the designated color adjusting color chart 38c shall be referred to as a presentation area.

Figure 9:
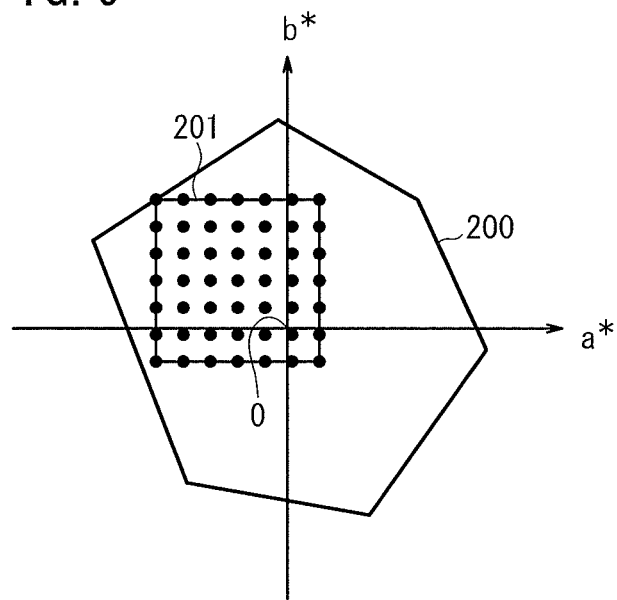
FIG. 9 is a diagram showing a presentation area formed by the designated color adjusting color chart according to the embodiment.

FIG. 9 is a diagram showing a presentation area of the designated color adjusting color chart 38c according to the present embodiment. A hexagonal area formed in the a*–b* plane, with L* being fixed, represents a gamut 200 of the printing machine 18. If colors of the color patches 44 are plotted according to the above equations (2) and (3), for example, then the plotted points are disposed at equal intervals. At this time, the presentation area 201 corresponds to a rectangular area formed by four points ($a^*_0+3\Delta a^*$, $b^*_0+3\Delta b^*$), ($a^*_0+3\Delta a^*$, $b^*_0-3\Delta b^*$), ($a^*_0-3\Delta a^*$, $b^*_0+3\Delta b^*$), ($a^*_0-3\Delta a^*$, $b^*_0-3\Delta b^*$).

The presentation area 201 is not limited to being of a rectangular shape, but may be of a rhombic shape. Moreover, the presentation area is not required to be parallel to a plane (L*–a* plane, a*–b* plane, or L*–b* plane) formed by the equal color space at all times. Rather, the three variables may be changed gradually at each of the positions of the color patches 44.

Thereafter, the data acquiring unit 82 shown in FIG. 4 acquires, in advance, a group 102 of profiles of print mediums, a group 104 of spectral data of laminate films, and a group 106 of spectral data of light sources, from the storage unit 70.

A means for storing the group 102 of profiles of print mediums, the group 104 of spectral data of laminate films, and the group 106 of spectral data of light sources is not limited to the storage unit 70 in the main unit 24, and such data may be stored in an external device. For example, such a means for storing the above data group may comprise a portable memory 34 or database DB (see FIG. 1). When such database DB stores various data, the main unit 24 (more specifically the data acquiring unit 82) may acquire various data through the network 12 (see FIG. 1) and I/F 50 (see FIG. 3).

Thereafter, the L*a*b*(obs)-to-XYZ converting section 94 converts L*a*b*(obs) into XYZ, based on various data under an actual exhibition condition. The data under the actual exhibition condition refer to data corresponding to profile generating conditions preliminarily set by the setting screen 134 in FIG. 6A.

More specifically, the data acquiring unit 82 selects the print profile of the print medium 36 depending on a given type thereof (e.g., [PVC (A)] in FIG. 6A), from the group 102 of print mediums. Also, the data acquiring unit 82 selects the spectral data of the laminate film 40 depending on a given type thereof (e.g., [MATT B] in FIG. 6A), from the group 104 of spectral data of laminate films. Further, the data acquiring unit 82 selects the spectral data of the light source DS depending on a given type thereof (e.g., [A] light source in FIG. 6A), from the group 106 of spectral data of light sources.

The type of print medium 36, the type of laminate film 40, or the type of light source DS is acquired by input operation through the setting screen 150 (see FIG. 6B) by the input device 28. However, such an acquiring process is not limited to the above input operation. For example, various data (e.g., tag information of data file) associated with an electronic manuscript corresponding to a print 38 may be acquired thereby to automatically identify types of print medium 36, etc.

Thereafter, the XYZ-to-L*a*b*(sim) converting section 96 converts the XYZ into L*a*b*(sim), based on data under a print simulation. The data under a print simulation refer to data corresponding to profile generating conditions preliminarily set by the setting screen 150 in FIG. 6B.

More specifically, the data acquiring unit 82 selects the print profile of the print medium 36 depending on a given type thereof ([PVC (A)], i.e., the same in FIG. 6A), from the group 102 of print mediums. Also, the data acquiring unit 82 selects the spectral data of the laminate film 40 depending on a given type thereof ([NONE] in FIG. 6B), from the group 104 of spectral data of laminate films. Further, the data acquiring unit 82 selects the spectral data of the light source PS depending on a given type thereof ([D50] in FIG. 6B), from the group 106 of spectral data of light sources.

As in the present embodiment, when the light source PS is set to the standard light source, i.e., D50 light source, and the laminate film 40 is set to [NONE] (spectral reflectivity or spectral transmissivity is 1 for each light wavelength), the conversion of XYZ into L*a*b*(sim) does not require these data.

As described above, since the patch color converter 86 performs, in advance, color conversion not only on a reference color (L*$_0$, a*$_0$, b*$_0$) but also on colors close to the reference color, a correspondence relation among L*a*b* (obs), L*a*b*(sim) and a selection number 98, of the color patches 44, advantageously can be grasped easily.

Thereafter, the designated color adjusting data generator 76 shown in FIG. 4 generates image data. The image data are generated such that the color patch 44 of the reference color is disposed at the central position of the color patches 44, i.e., at a position where the row number 46 is (0) and the column number 48 is (0) in FIG. 2, and such that the color differences between adjacent ones of the color patches 44 in one row or one column are substantially equal.

Image data generated by the designated color adjusting data generator 76 are supplied via a path R2 to the print profile processor 74. The image data are supplied from the print profile processor 74 to the printing machine 18, in the same manner as when an electronic manuscript is printed. Color patches 44 of the designated color adjusting color chart 38c (see FIG. 2) substantially reproduce the preset color (L*, a*, b*) and colors close to the preset color.

Then, the operator selects one of the color patches 44 of the printed designated color adjusting color chart 38c (step S64). Specifically, the operator visually compares a color sample representing a designated color serving as a target represented by a color chip or a color displayed by the display device 26 with the designated color adjusting color chart 38c, and selects one of the color patches 44 whose color is closest to the designated color.

In the conventional techniques, in order to match the observational conditions with the actual exhibition conditions (print conditions and observational manners), it is necessary to provide a laminate film 40 on the designated color adjusting color chart 38c, and then carry the designated color adjusting color chart 38c with the laminate film 40 to the exhibition site and observe the color chart 38c under the light source DS. However, according to the present embodiment, since the designated color adjusting color chart 38c is printed after the patch color converter 86 has converted L*a*b*(obs) under the actual exhibition conditions into L*a*b*(sim) under the print simulation, color adjustment (i.e., print simulation) can be performed without the need for laminating the laminate film 40 by the laminating apparatus 20. Further, even under the light source PS as currently used, the conditions under the different light source DS can be simulated.

Also, the operator visually recognizes the colors of the color patches 44 as they change at substantially equal intervals when the operator visually observes the designated color adjusting color chart 38c, the operator can easily select a color patch 44 whose color is closest to the designated color. Particularly when the designated color is a color out of the gamut 200 or a color that falls within the gamut 200 but near the gamut boundary, it takes little time to select a color patch 44.

Then, the operator enters the identification information of the selected color patch 44 (step S65). Specifically, on the setting screen 110 shown in FIG. 5, the operator references the numeral strings 114 based on numerical values (see FIG. 2) represented by the row number 46 and the column number 48 which correspond to the position of the selected color patch 44, and then pushes one of the radio buttons 112 (see FIG. 5) corresponding to the numerical value. Since the radio buttons are an exclusive type of switch, when one of the 49 radio buttons 112 is pushed, the other buttons pop out. Thus, a selection number 98 is input as the identification information of the selected color patch 44.

Then, the operator determines whether a color that is substantially the same as the designated color has been reproduced by the selected color patch 44 (step S66). If the operator judges that a color that is substantially the same as the designated color has not been reproduced, but there is still a possibility of selection, then the operator manually or automatically resets a next reference color and color difference interval (step S67). Thereafter, the operator pushes down the [NEXT PRINT] button 128, and a designated color adjusting color chart 38c is accordingly printed based on the reset reference color and color difference interval. In this manner, printing and evaluating are repeated (step S61 through step S66). IF the [CANCEL] button 132 is pushed during the designated color adjustment operation, the operation is halted without change of data contents.

The above process is repeated until a color that is identical to the designated color is reproduced on the designated color adjusting color chart 38c. Subsequently, when the [FINALIZE] button 130 is pushed down, a color conversion LUT, i.e., a part of the profile data, is changed (step S68), and the process of adjusting the designated color is completed.

Assuming that a color selection begins at a firstly-set reference color ($L_0^*$, $a_0^*$, $b_0^*$) and, as a result, ($L^*_0$(select), $a^*_0$(select), $b^*_0$(select)) are selected as selected color values (or first color values) $L^*a^*b^*$(obs), i.e., color values of the selected color patch 44, the profile generator 80 calculates corrective amounts based on the first color values acquired by the first color value acquiring unit 88*a* and the second color values of the designated color acquired by the second color value acquiring unit 88*b*. For example, the profile generator 80 calculates corrective amounts $L^*$(diff), $a^*$(diff), $b^*$(diff) according to the following equations (4) through (6):

$$L^*(\text{diff}) = L^*(\text{select}) - L_0^* \tag{4}$$

$$a^*(\text{diff}) = a^*(\text{select}) - a_0^* \tag{5}$$

$$b^*(\text{diff}) = b^*(\text{select}) - b_0^* \tag{6}$$

When the print 38 are generated based on the electronic manuscript (print data), the corrective amounts $L^*$(diff), $a^*$(diff), $b^*$(diff) are added to the designed values of the colors, for thereby correcting a slight shift in the print color in order to achieve an increase in color reproduction accuracy.

Also, the above effects can be obtained by directly modifying the color values of the electronic manuscript, instead of by changing the print profile. The operator can perform color correction of the electronic manuscript while referencing color information displayed on the result screen 300 as shown in FIG. 10.

At an upper part of the result screen 300, there is provided a column 302 for displaying color information (including the second color values) of the designated color that has been input in advance.

For example, if a spot color name is entered, the spot color name is displayed in a small column 304. At the same time, the $L^*$, $a^*$, $b^*$ values corresponding to the spot color name are displayed in a small column 306, the R, G, B values corresponding to the spot color name are displayed in the small column 308, and the C, M, Y, K values corresponding to the spot color name are displayed in the small column 310. A process of designating the color values, i.e., "DESIGNATE IN SPOT COLOR NAME" in this case, is displayed in a small column 312.

At a lower-left part of the result screen 300, there is provided a column 314 for displaying color values (color values of electronic manuscript) used when the designated color is reproduced with the printing machine 18.

For example, the selected color values (device-independent data), i.e., the $L^*$, $a^*$, $b^*$ values, are displayed in a set of small columns 316.

Also, values obtained by converting the selected color values into device-dependent data using a profile, i.e., R, G, B values, are displayed in a set of small columns 318. Depending on a profile that is selected through a pull-down menu 320, the color value converter 89 converts the second color values into corresponding R, G, B values, according to a $L^*a^*b^*$ to RGB conversion table contained in the profile used. The values are immediately updated with the obtained R, G, B values, which are displayed in the set of the small columns 318.

Further, values obtained by converting the selected color values into device-dependent data using a profile, i.e., C, M, Y, K values, are displayed in a set of small columns 322. Depending on a profile that is selected through a pull-down menu 324, the color value converter 89 converts the second color values into corresponding C, M, Y, K values, according to a $L^*a^*b^*$ to CMYK conversion table contained in the profile used. The values are immediately updated with the obtained C, M, Y, K values, which are displayed in the set of the small columns 322.

At a lower-right part of the result screen 300, there is provided a column 326 for displaying corrected values of the spot color database. For example, the selected color values (device-independent data), i.e., $L^*$, $a^*$, $b^*$ values are displayed in a set of small columns 328. Also, values obtained by converting the selected color values into device-dependent data using the entered profile, i.e., C, M, Y, K values, are displayed in a set of small columns 330.

The operator acquires some of the color information displayed in the result screen 300, and uses the acquired color information to correct color values of the electronic manuscript. For example, the operator may correct the color values using a data editing function (not shown).

Further, the management information ($L^*$, $a^*$, $b^*$ values or C, M, Y, K values) of a spot color database managed by the image processing apparatus 16 or an external device thereof (e.g., database DB) can be automatically or manually updated into the above corrected values. The color of the print 38 can be adjusted by using the updated spot color data.

The present invention is not limited to the above embodiment. Various changes and modifications can be made without departing from the scope of the invention, for example, as indicated by (1) through (6) below.

(1) In the above embodiment, color chart condition data 90 (reference colors and color difference intervals) are automatically determined by the color chart condition determining unit 84. However, specification changes may be made in view of preferences of the operator or the client as to color selections.

More specifically, the display windows 124, 126 may include text boxes, which initially display recommended values determined by the color chart condition determining unit 84. The operator may change the displayed values and/or set the changed values using the keyboard 30, etc. The operator may freely change the number of color patches 44.

(2) In the above embodiment, the color patches 44 of the designated color adjusting color chart 38*c* are rectangular in shape. However, the color patches 44 are not limited to being rectangular in shape, but may be of a triangular shape, a hexagonal shape, a circular shape, or the like.

The color patches 44 may be arranged in any of various layouts, insofar as their corresponding relationship to the identification information is clear. For example, if the color patches 44 are of a regular hexagonal shape, then the color patches 44 may be arranged in a honeycomb pattern.

(3) In the above embodiment, the row numbers 46 and the column numbers 48 (see FIG. 2) included in the designated color adjusting color chart 38*c* are entered as identification information into the setting screen 110 (see FIG. 5). However, the identification information may be entered in other ways. For example, an intermediate color between adjacent color patches 44 may be entered using a GUI controller, such as a color wheel or the like. Further, the color sample number, the color value, or the like, corresponding to the selected color patch 44 may be entered directly.

(4) With respect to distortions of the equal color space referred to above, the color difference interval may be established in view of (a) the tendency of highly saturated colors to be less sensitive to changes in the direction of saturation, (b) the tendency of a green range to be less sensitive to changes in hues, (c) the tendency of highly light colors or lowly light colors to be less sensitive to changes in lightness, and (d) the tendency of a blue range to be less sensitive to changes in the direction of saturation.

(5) If it is impossible or difficult for the printing machine 18 to reproduce a designated color, then the designated color outside of the gamut 200 needs to be replaced with a color inside the gamut 200. In this case, the profile can be changed based on any of various gamut mapping algorithms. For example, it is preferable to select a color close to the boundary of the gamut 200 in order to minimize the color difference between those colors, while keeping a lightness difference (or saturation difference) between the colors within an allowable range, for example.

(6) In the above embodiment, the printing machine 18 comprises an inkjet printing apparatus. However, the printing machine 18 may comprise an electrophotographic apparatus, a thermosensitive apparatus, or the like.

Although a certain preferred embodiment of the present invention has been shown and described in detail, it should be understood that various changes and modifications may be made to the embodiment without departing from the scope of the invention as set forth in the appended claims.

What is claimed is:

1. A color value acquiring method comprising:
   a first inputting step of inputting a type of print medium and a type of protective film;
   a data acquiring step of acquiring color reproduction data of a print obtained by forming an image on a print medium corresponding to the input type of print medium, and spectral data of a protective film corresponding to the input type of protective film;
   a reference color determining step of determining a reference color based on color information of a designated color to be reproduced on a protective-film-covered print obtained by laminating the protective film on the print;
   a reference color converting step of converting the determined reference color into another reference color depending on the print without the protective film laminated thereon, based on the acquired color reproduction data of the print and the acquired spectral data of the protective film;
   a printing step of printing a color chart including a plurality of color patches, based on a plurality of color values depending on the converted other reference color or colors close to the other reference color;
   a second inputting step of inputting identification information of a color patch, the color patch having been selected, from the printed color chart, as a color that is closest to the designated color, under a condition where the protective film is not laminated; and
   a color value acquiring step of acquiring a selected color value that is a color value depending on the selected color patch, based on the input identification information.

2. A color value acquiring method according to claim 1, wherein:
   in the first inputting step, a type of observational light source is further input;
   in the data acquiring step, spectral data of an observational light source corresponding to the input type of observational light source is further acquired; and
   in the converting step, the determined reference color is converted into another reference color depending on a certain light source that is identical with or different from the observational light source, by further using the acquired spectral data of the observational light source.

3. A color value acquiring method according to claim 1, further comprising a generating step of generating image data depending on the color chart,
   wherein the image data comprise the plurality of the color values calculated such that the color patches are formed two-dimensionally on the print medium around the other reference color and that color differences in an equal color space between adjacent ones of the color patches in one row or one column are substantially equal.

4. A color value acquiring method according to claim 1, further comprising a displaying step of displaying color information of the acquired selected color value.

5. A color value acquiring method according to claim 4, further comprising a color value converting step of converting the selected color value into device-dependent data of a printing machine using a profile for printing the print with the printing machine,
   wherein, in the displaying step, the converted device-dependent data are further displayed.

6. A color value acquiring apparatus comprising:
   a first input section for inputting a type of print medium and a type of protective film;
   a data acquiring unit for acquiring color reproduction data of a print obtained by forming an image on a print medium corresponding to the type of print medium input by the first input section, and spectral data of a protective film corresponding to the type of protective film input by the first input section;
   a reference color determining unit for determining a reference color based on color information of a designated color to be reproduced on a protective-film covered print obtained by laminating the protective film on the print;
   a reference color converter for converting the reference color determined by the reference color determining unit into another reference color depending on the print without the protective film laminated thereon, based on the color reproduction data of the print and the spectral data of the protective film acquired by the data acquiring unit;
   a print controller for controlling a printing machine to print a color chart including a plurality of color patches, based on a plurality of color values depending on the other reference color converted by the reference color converter or colors close to the other reference color;
   a second input section for inputting identification information of a color patch, the color patch having been selected, from the color chart printed by the printing machine, as a color that is closest to the designated color, under a condition where the protective film is not laminated; and
   a color value acquiring unit for acquiring a selected color value that is a color value depending on the selected color patch, based on the identification information input by the second input section.

7. A color value acquiring apparatus according to claim 6, wherein:
   the first input section further inputs a type of observational light source;
   the data acquiring unit further acquires spectral data of an observational light source corresponding to the type of observational light source input by the first input section; and
   the reference color converter converts the determined reference color into another reference color depending on a certain light source that is identical with or different from the observational light source, by further using the spectral data of the observational light source acquired by the data acquiring unit.

8. A color value acquiring apparatus according to claim 6, further comprising an image data generator for generating image data depending on the color chart, wherein the image data comprise the plurality of the color values calculated such that the color patches are formed two-dimensionally on the print medium around the other reference color and that color differences in an equal color space between adjacent ones of the color patches in one row or one column are substantially equal.

9. A color value acquiring apparatus according to claim 6, further comprising a display device for displaying color information of the selected color value acquired by the color value acquiring unit.

10. A color value acquiring apparatus according to claim 9, further comprising a color value converter for converting the selected color value into device-dependent data of a printing machine using a profile for printing the print with the printing machine,
wherein the display device further displays the device-dependent data converted by the color value converter.

11. An image processing method comprising:
a first inputting step of inputting a type of print medium and a type of protective film;
a data acquiring step of acquiring color reproduction data of a print obtained by forming an image on a print medium corresponding to the input type of print medium, and spectral data of a protective film corresponding to the input type of protective film;
a reference color determining step of determining a reference color based on color information of a designated color to be reproduced on a protective-film covered print obtained by laminating the protective film on the print;
a reference color converting step of converting the determined reference color into another reference color depending on the print without the protective film laminated thereon, based on the acquired color reproduction data of the print and the acquired spectral data of the protective film;
a printing step of printing a color chart including a plurality of color patches, based on a plurality of color values depending on the converted other reference color or colors close to the other reference color;
a second inputting step of inputting identification information of a color patch, the color patch having been selected, from the printed color chart, as a color that is closest to the designated color, under a condition where the protective film is not laminated;
a first color value acquiring step of acquiring a color value depending on the selected color patch as a first color value, based on the input identification information;
a second color value acquiring step of acquiring a color value of the designated color as a second color value; and
a color adjusting step of adjusting colors of the print to be covered with the protective film, based on the acquired first and second color values.

12. An image processing apparatus comprising:
a first input section for inputting a type of print medium and a type of protective film;
a data acquiring unit for acquiring color reproduction data of a print obtained by forming an image on a print medium corresponding to the type of print medium input by the first input section, and spectral data of a protective film corresponding to the type of protective film input by the first input section;
a reference color determining unit for determining a reference color based on color information of a designated color to be reproduced on a protective-film covered print obtained by laminating the protective film on the print;
a reference color converter for converting the reference color determined by the reference color determining unit into another reference color depending on the print without the protective film laminated thereon, based on the color reproduction data of the print and the spectral data of the protective film acquired by the data acquiring unit;
a print controller for controlling a printing machine to print a color chart including a plurality of color patches, based on a plurality of color values depending on the other reference color converted by the reference color converter or colors close to the other reference color;
a second input section for inputting identification information of a color patch, the color patch having been selected, from the color chart printed by the printing machine, as a color that is closest to the designated color, under a condition where the protective film is not laminated;
a first color value acquiring unit for acquiring a color value depending on the selected color patch as a first color value, based on the identification information input by the second input section;
a second color value acquiring unit for acquiring a color value of the designated color as a second color value; and
a color adjusting section for adjusting colors of the print to be covered with the protective film, based on the first color value acquired by the first color value acquiring unit and the second color value acquired by the second color value acquiring unit.

13. A non-transitory computer-readable recording medium storing a program for enabling a computer to function as:
a first input section for inputting a type of print medium and a type of protective film;
a data acquiring unit for acquiring color reproduction data of a print obtained by forming an image on a print medium corresponding to the input type of print medium, and spectral data of a protective film corresponding to the input type of protective film;
a reference color determining unit for determining a reference color based on color information of a designated color to be reproduced on a protective-film covered print obtained by laminating the protective film on the print;
a reference color converter for converting the determined reference color into another reference color depending on the print without the protective film laminated thereon, based on the acquired color reproduction data of the print and the acquired spectral data of the protective film;
a print controller for controlling a printing machine to print a color chart including a plurality of color patches, based on a plurality of color values depending on the converted other reference color or colors close to the other reference color;
a second input section for inputting identification information of a color patch, the color patch having been selected, from the printed color chart, as a color that is closest to the designated color, under a condition where the protective film is not laminated; and
a color value acquiring unit for acquiring a selected color value that is a color value depending on the selected color patch, based on the input identification information.

* * * * *